FADER AMPLIFIER INCLUDING A DIFFERENTIAL GAIN CONTROL MECHANISM

Filed Jan. 21, 1964

2 Sheets-Sheet 1

July 12, 1966 G. B. THOMPSON 3,260,954

FADER AMPLIFIER INCLUDING A DIFFERENTIAL GAIN CONTROL MECHANISM

Filed Jan. 21, 1964 2 Sheets-Sheet 2

United States Patent Office 3,260,954

Patented July 12, 1966

3,260,954

FADER AMPLIFIER INCLUDING A DIFFERENTIAL GAIN CONTROL MECHANISM

Gordon B. Thompson, Ottawa, Ontario, Canada, assignor to Northern Electric Company Limited, Montreal, Quebec, Canada Filed Jan. 21, 1964, Ser. No. 339,217
8 Claims. (Cl. 330—69)

This invention relates to improvements in circuits for use in a transmission system for the fading and/or cross mixing (superimposition, with or without changes of signal strength) of one or more signals, usually television signals.

Such circuits are commonly referred to as fader amplifiers, since their prime utility is in the fading in or fading out of a single video signal, or the simultaneous fading in of one signal and fading out of another (dissolving). Although, as indicated above, such circuits can also be used for direct superimposition of video signals without fading, they will be referred to in this specification as "fader amplifiers." Moreover, the term "amplifier" is used in the sense of a circuit for modifying the amplitude of a signal, not necessarily to increase it.

Conventionally, television fader amplifiers are provided with a pair of control members, usually manually operable levers, one such member controlling the strength of a first video signal and the other member controlling the strength of a second video signal. By moving the control members simultaneously, the strength of one signal can be reduced while that of the other is increased so as theoretically to maintain a constant total signal strength while merging from one video signal to the other. This process is known as a complementary mix and may be expressed as $$C=pA+qB \qquad (1)$$

where A and B are the input video signals and are assumed to have the standard nominal television level. C is the combined output signal, and $$p+q=1 \qquad (2)$$

where $p$ and $q$ both lie somewhere in the range from zero to unity.

The same apparatus can be used for fading in or fading out a single signal, for superimposing a pair of signals each at full strength, or fading in or fading out a pair of superimposed signals. In these later instances the total signal strength does not remain constant and the condition known as a non-complementary mix exists. The sum $p+q$ can now lie anywhere between zero and 2.

Although the invention is primarily directed towards a fader amplifier for use with video signals, and will be so exemplified, it can also be used in any other circumstances where remote control of the mixing and/or fading of wide-band signals is required, one such application being that of radio broadcasting.

In prior forms of fader amplifiers, it has been the practice for each control member to move an electrical control element, such as a potentiometer, which in turn controls the gain of an amplifier in each respective video circuit. The outputs of the two amplifiers are then added to form a composite output. Linearity of control and true maintenance of a constant signal strength in the final output (namely, satisfaction of Equations (1) and (2) above) is only possible if the potentiometers are identical and the variable gain stages in the two amplifiers have identical responses to the control voltages from the potentiometers. As a practical matter it has proved impossible to achieve these conditions with an error of less than about 10%, without providing elaborate compensating systems. Even then some discernable error usually remains. This is the principal disadvantage of the prior systems, and it is the prime object of the present invention to provide improvements in this regard, namely to provide a fader amplifier which has a smaller deviation from ideal performance, and yet which achieves this object without undue complication of the equipment.

The object of the invention is to provide a fader amplifier having improved performance in relation to prior forms of fader amplifiers. More particularly, an object of the present invention is to provide a fader amplifier capable of performing either a complementary or a non-complementary mix, and in which the problem of achieving an accurate complementary mix is overcome without any need to provide excessively precision built equipment or compensating devices.

In its broad scope the invention consists of a fader amplifier comprising:

(a) input means for a first signal A and a second signal B, (b) first amplifier means coupled to said input means for generating a third signal $C=k(B-A)+A$, where $k$ is a gain factor, and including means for varying $k$ between zero and unity, (c) and second amplifier means coupled to said first amplifier means for multiplying said signal C by a factor $m$ to produce a fourth signal $D=m[k(B-A)+A]$, where $m$ is a further gain factor.

In the preferred form of the invention, there is also provided (d) means for varying said further gain factor $m$ between zero and two, (e) a pair of control members movable individually through coterminous paths of travel, (f) means responsive to the mean position of said control members along said paths for controlling the means for varying $k$ to render said gain factor $k$ equal to zero when said mean position is located at one extremity of said paths and to render said gain factor $k$ equal to unity when said mean position is located at the other extremity of said paths, (g) and means responsive to the spread between said control members for controlling said varying means (d) to render said further gain factor $m$ equal to unity when said spread is zero, to render said factor $m$ equal to zero when said spread consists of the full extent of said paths in one sense, and to render said factor $m$ equal to two when said spread consists of the full extent of said paths in the other sense, (h) whereby movement of said control members in unison from one said extremity of said paths to the other said extremity effects a complementary mix of said first and second signals, and spreading of said control members apart effects a noncomplementary superimposition of said first and second signals.

In a specific example of the invention, the responsive means listed above as items (f) and (g) may consist of (i) a different mechanism having two sun wheels, at least one planet wheel and a planet wheel cage, (j) means connecting each said control member to a respective said sun wheel, (k) means connecting the varying means for $k$ to said cage, (l) and means connecting the varying means for $m$ to said planet wheel.

A manner in which the present invention may be carried into practice is illustrated by way of example in the accompanying drawings, the specific circuits shown being provided by way of example only.

Figure 2:
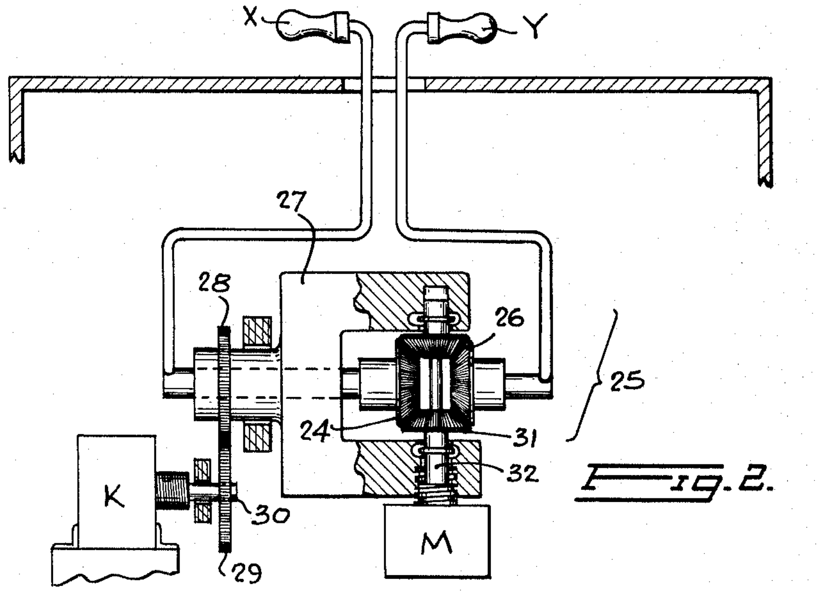
FIGURE 2 is a diagrammatic illustration of a mechanical arrangement of control levers for the circuit of FIGURE 1.
Figure 3:
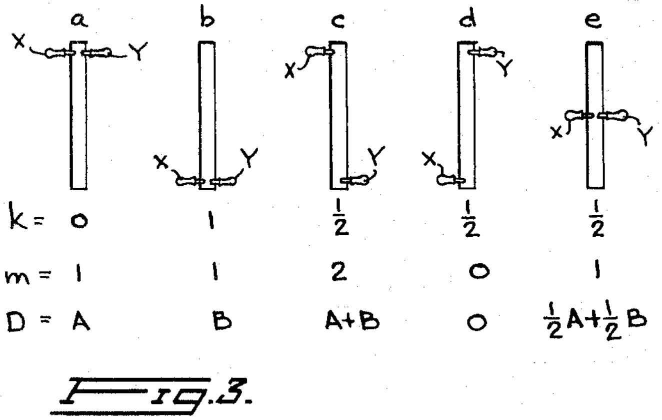
Figure 4:
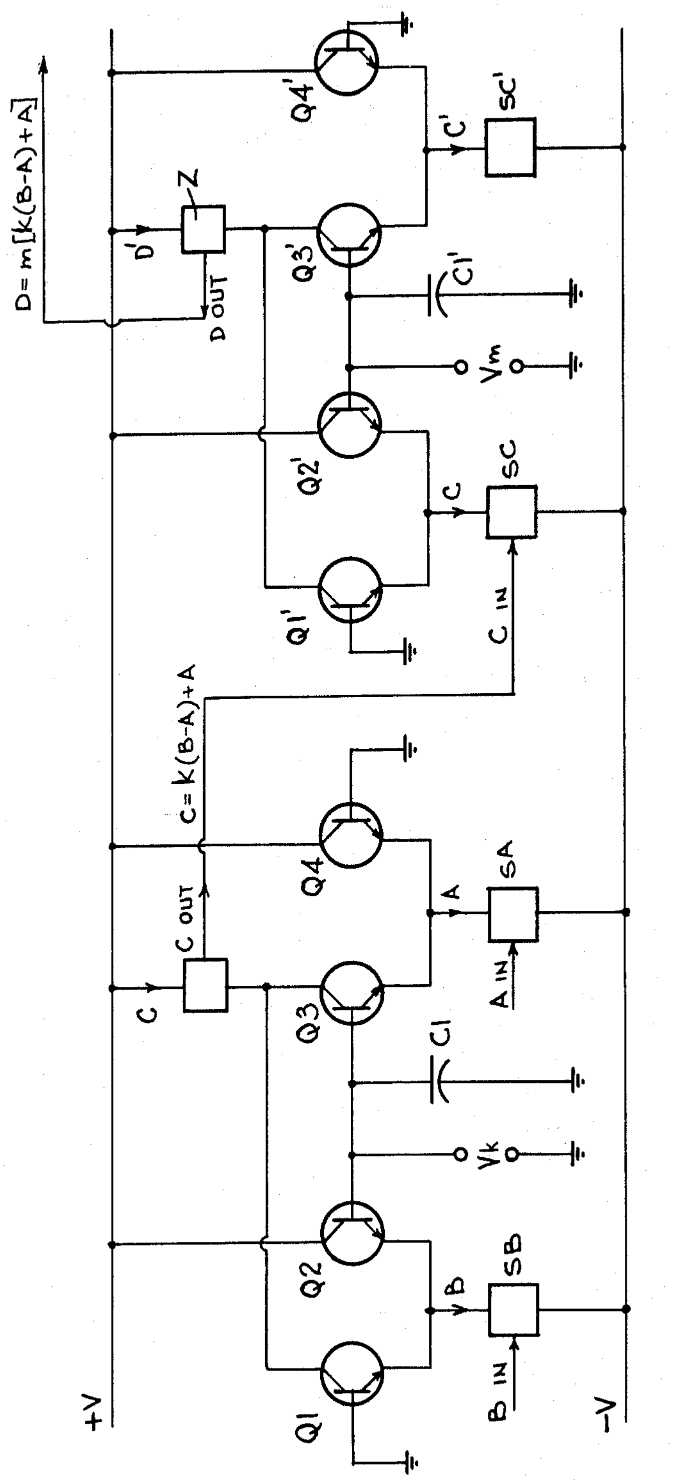

FIGURES 3*a* to *e* comprise a series of sketches with an accompanying table demonstrating the effects achieved with various positions of the control levers of FIGURE 2; and FIGURE 4 is a more detailed circuit for use in carrying the invention into practice.

Figure 1:
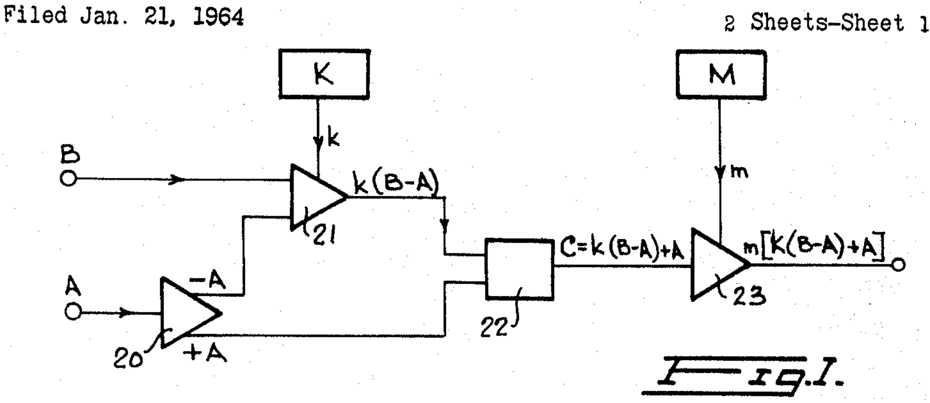
FIGURE 1 is a block diagram of a circuit in accordance with the present invention.

FIGURE 1 shows a pair of input terminals at which respective video signals A and B are applied. Terminal A is connected to a phase inverter 20 having two outputs +A and −A. The signal −A is added to the signal B in a variable gain amplifier 21, the gain of which is represented by the symbol $k$ and is controlled from a potentiometer K. The output from amplifier 21 is thus $k(B-A)$. This output is added in mixer 22 to the signal +A to produce a signal $$C=k(B-A)+A \qquad (3)$$

The output C is fed to a further variable gain amplifier 23, the gain of which is represented as $m$, being controlled by a potentiometer M. The output from amplifier 23 applied to terminal D is thus shown by the equation $$D=m[k(B-A)+A] \qquad (4)$$

It is assumed that $k$ varies between 0 and 1, and $m$ varies between 0 and 2. It is apparent from Equation 4 that D will equal $m$A when $k=0$, and will equal $m$B when $k=1$.

Reference should now be made to FIGURE 2 for a description of a method of controlling the potentiometers K and M from a pair of control levers X and Y. Control lever X is connected directly to one sun wheel 24 of a differential mechanism 25, and the other control lever Y is connected to the other sun wheel 26 of this mechanism. The planet wheel cage 27 is connected by gearing 28, 29 to the shaft 30 of the potentiometer K, while one of the planet wheels 31 is connected to rotate with the shaft 32 of the potentiometer M. The casing of the potentiometer M is mounted on the cage 27. Since the maximum rotational travel of the cage 27 is limited by the finite travel of the levers X and Y, the potentiometer M can be adequately connected in circuited by an elongated flexible lead (not shown).

FIGURE 3 illustrates the conditions that will pertain when the control levers X and Y are placed in their various positions. As shown in FIGURE 3*a*, when levers X and Y are both at the same end of their travel, the cage 27 and the potentiometer K are fully rotated in one direction, or $k=0$. There being no relative displacement of the levers X and Y and hence no rotation of the planet wheel 31 about its own axis, the potentiometer M is in a central position which is equivalent to $m=1$. Thus, in accordance with Equation 4 the output $D=A$.

When both control levers X and Y are moved to their other extreme position, as shown in FIGURE 3*b*, the cage 27 and the potentiometer K are fully rotated, so that $k=1$, while potentiometer M remains unchanged. Accordingly, the output $D=B$.

If, starting at the position of FIGURE 3*a*, the control lever Y only were moved to the other end of its travel, as shown in FIGURE 3*c*, the result is relative rotation of the two sun wheels 24 and 26 with consequent rotation of the shaft 32 of the potentiometer M to one extreme, equivalent to $m=2$. This movement of the control lever Y without the control lever X will impart some movement to the cage 27, but only to half the extent that would apply if both control levers had been moved. As a result, $k=\frac{1}{2}$. The output D then equals $A+B$, which is a full superimposition of the two video signals, i.e. a non-complementary mix. The reverse situation, in which only control lever X is moved, is shown in FIGURE 3*d*, where $k=\frac{1}{2}$; $m=0$ and $D=0$. When both levers X and Y are placed in an intermediate position $k=\frac{1}{2}$ and $m=1$, so that $C=\frac{1}{2}A+\frac{1}{2}B$.

It will be apparent from FIGURE 3 that, in effect, the lever X controls the proportion of signal A in the output, such proportion having its maximum value when the lever is in the upper position in the drawing. The lever Y similarly controls signal B, giving it its maximum proportion in the output when the lever is in the lower position in the drawing. The apparatus will in practice be calibrated in this manner, for the benefit of the operator. He can perform a complementary mix from $D=A$ to $D=B$ by moving both levers simultaneously from the FIGURE 3*a* position to the FIGURE 3*b* position.

However, it will be noted that this arrangement differs from the prior art arrangement in that the levers X and Y do not directly control individual potentiometers in amplifiers controlling the signals A and B respectively in such a manner that any lack of identity between the pair of potentiometers or lack of similarity of response thereto thereto by the amplifiers would give rise to non-linearity. In the present construction both the potentiometers K and M are controlled by the combined operation of the two levers X and Y, and identity between the potentiometers K and M is no longer required. The factor $k$ is determined by the mean position of the two levers (as calculated from one end of their travel) and varies from 0 to 1; whereas the factor $m$ is determined by the degree of spread between the levers, the latter factor varying from unity when the control levers are aligned; to 0 when they are fully spread in one sense; and 2, when they are fully spread in the other sense.

The results achieved, as far as the necessary manual operation of the control levers X and Y is concerned, are identical with those of a conventional fader amplifier system. The device can be integrated into an overall television broadcasting system without giving rise to confusion or requiring special operating instructions or technique. That is, the operator need not learn a new operating technique, since he will perform the same movements as in conventional systems to achieve the same final result. But this result is achieved in a novel way which improves performance by enabling a substantial improvement in accuracy when obtaining a complementary mix, as will now be described in greater detail.

Suppose that the potentiometer K had a substantial error in its linearity, so that movement of its shaft through 50% of the travel brought the factor $k$ up from 0 to 0.4 instead of the theoretical figure of 0.5. Consider the effect of this error on the performance of a complementary mix which is a very common operation and the most critical one for the apparatus, because it is under these circumstances, and only under these circumstances, that Equations 1 and 2 are required to be satisfied. A complementary mix is achieved by moving the levers X and Y from the FIGURE 3*a* position, through that of FIGURE 3*e* to that of FIGURE 3*b*. There is no relative movement of the levers X and Y and hence no change to $m$. Whether $m$ is exactly equal to unity is not important. Whatever its value, it will be unchanged by the movement of the levers. When the levers have reached the FIGURE 3*e* position the value of D will be given by 0.4 $(B-A)+A=0.4B+0.6A$, and Equations 1 and 2 are satisfied with $p=0.6$ and $q=0.4$. The linearity error of the potentiometer K has thus not detracted from the truly complementary nature of the mix, although it will have rendered the calibration of the levers X and Y slightly inaccurate, a factor which can readily be provided for in marking the scale along which the levers slide. Practical experiments indicate that the error in the total signal strength that can be achieved by this arrangement can be typical as low as 0.5%.

The second potentiometer M is used for non-complementary mixing of the video signals, that is when the total output signal strength is not to be kept constant. The setting of the potentiometer M is dependent on the degree and sense of separation of the two control levers X and Y, and permits various stages of superimposition of the two signals from full superimposition (FIGURE 3*c*) to zero output (FIGURE 3*d*). Starting from the position of FIGURE 3*e*, if the lever X is moved down half the way to the end of its travel and the lever Y is moved upwardly the same distance, $k=\frac{1}{2}$, $m=\frac{1}{2}$ and $D=\frac{1}{4}A+\frac{1}{4}B$, and both signals are faded out simultaneously, the ultimate condition when the levers have travelled their full distances being $D=0$ (FIGURE 3*d*). Moving the other way from FIGURE 3*e*, i.e. towards FIGURE 3*c*, at the halfway condition $k=\frac{1}{2}$ and $m=1\frac{1}{2}$ so that $D=\frac{3}{4}A+\frac{3}{4}B$. Finally, the condition of full superimposition $D=A+B$ is achieved.

As an alternative to the mechanical arrangement of FIGURE 2, an electrical differential in combination with the conventional arrangement of controls may be used. The advantages of such an arrangement over prior art arrangements are as already stated, except that accurate potentiometers are required.

The circuit to accomplish these results may be composed of conventional components arranged as shown in FIGURE 1.

Alternatively, there may be employed the circuit of FIGURE 4, which circuit in itself forms the invention of Alan R. Kaye and Cecil L. Murray, described and claimed in United States patent application Serial No. 339,216, filed concurrently herewith.

In FIGURE 4, a first set of four transistors Q1 to Q4 are shown connected in parallel between direct supply voltages +V and −V. The bases of transistors Q1 and Q4 are directly coupled to ground, while the bases of transistors Q2 and Q3 are grounded at signal frequencies through capacitor C1, while being biased by control voltage V*k*. Signal generators shown diagrammatically at SA and SB are assumed to have an internal impedance very much higher than the low input impedance of the two transistors in parallel. The generators SA and SB, which in fact consist of conventional input coupling circuits for introducing the video signals A and B, act essentially as current generators rather than as voltage generators. By varying the control voltage V*k* through a small range above and below ground potential (about ±0.2 volt) the ratio of the input impedances of the transistors Q1 and Q2 can be varied throughout the range from approximately 0 to a very large value tending towards infinity. At the same time the ratio of the input impedances of the transistors Q3 and Q4 will be similarly varied. The outputs of transistors Q1 and Q3 are added as current C. Assuming that both parts of the circuit respond in an identical fashion to the control voltage V*k*, the combined output current C is given by $$C=(1-k)A+kB$$
$$=k(B-A)+A$$

where $$k=\frac{1}{1+e^{Vk/Vt}}$$

V*t* being a constant of the transistors at a given temperature.

This is Equation 3 and is the output from mixer 22 (FIGURE 1), being the basic requirements for complementary mixing. Thus, by arranging for the potentiometer K to supply the control voltage V*k* to vary *k* between zero and unity, the first part of the circuit of FIGURE 4 can perform at one time the functions of all three of the conventional components 20, 21 and 22 of FIGURE 1. It should be noted that D.C. components are treated in the same way as any other frequency, so that, provided the D.C. components of signals A and B are equal, there is no change in the D.C. level at the output resulting from changes to the value of V*k*.

The second stage of the circuit of FIGURE 4 is similar to the first stage, consisting of four transistors Q1′ to Q4′ connected in the same manner as transistors Q1 to Q4. The output C from the first stage is fed into the circuit of transistors Q1′, Q2′ by an input circuit represented by signal generator SC. As before, the base of transistor Q1′ is grounded, and that of transistor Q2′ is grounded at signal frequencies by capacitor C1′ and is biassed by control voltage V*m*. Transistors Q3′ and Q4′ are in circuit with a signal generator SC′ generating a current C′ equal to the D.C. component of the current C. Since this D.C. component is constant, the generator SC′ can be preset. The currents through transistors Q1′ and Q3′ are added as current D′ which satisfies the form of Equation 4 except that it now varies between zero and 1 and is given by the equation $$m=\frac{1}{1+e^{Vm/Vt}}$$

To obtain the desired output D the output circuit Z may conveniently include an amplifier giving a 2 to 1 gain so that the final output $D'=2D$, thus satisfying Equation 4 exactly. Of course, this amplification can take place at any other convenient location in the circuit.

The transistors Q3′ and Q4′ ensure that no change in the D.C. component of the output D occurs for any alteration of the control voltage V*m*.

In either stage of this circuit the other pair of collectors can be used to generate the output currents C and D. Similarly the inputs A and B can be changed throughout.

I claim:

1. A fader amplifier comprising
(a) input means for a first signal A and a second signal B,
(b) first amplifier means coupled to said input means for generating a third signal $C=k(B-A)+A$, where *k* is a gain factor, and including means for varying *k* between zero and unity,
(c) and second amplifier means coupled to said first amplifier means for multiplying said signal C by a factor *m* to produce a fourth signal $$D=m[k(B-A)+A]$$

where *m* is a further gain factor.

2. A fader amplifier comprising
(a) input means for a first signal A and a second signal B,
(b) means coupled to said input means, and including variable gain means, for subtracting said first signal from said second signal to generate a third signal $k(B-A)$, where *k* is a gain factor variable between zero and unity,
(c) and means, including further variable gain means, coupled to said input means and to said means (b) for adding said first and third signals to generate an output signal $m[k(B-A)+A]$, where m is a further gain factor.

3. A fader amplifier according to claim 2, wherein said means (b) includes means for inverting said first signal and means for adding said inverted signal to said second signal.

4. A fader amplifier according to claim 2 including
(d) a pair of control members movable through coterminous paths of travel,
(e) and first gain control means coupled to said control members and responsive to the mean position of said members along said paths, for varying said gain factor *k* in accordance with said mean position.

5. A fader amplifier according to claim 4 including second gain control means coupled to said control members and responsive to the spread between said members along said paths for varying said further gain factor *m* in accordance with said spread.

6. A fader amplifier according to claim 2 including
(d) a pair of control members movable through coterminous paths of travel, (e) a differential mechanism having two sun wheels, at least one planet wheel and a planet wheel cage, (f) means connecting each said control member to a respective said sun wheel, (g) means for varying said gain factor *k*, (h) means connecting said cage to said varying means (g) for varying said gain factor *k* in accordance with the mean position of said control members, (i) further means for varying said further gain factor *m*, (j) and means connecting said planet wheel to said further varying means (i) for varying said further gain factor *m* in accordance with the spread between said control members.

7. A fader amplifier comprising (a) input means for a first signal A and a second signal B, (b) means, including variable gain means, coupled to said input means for subtracting said first signal from said second signal to generate a third signal $k(B-A)$, where $k$ is a gain factor, (c) and means, including further variable gain means, coupled to said input means and to said means (b) for adding said first and third signals to generate an output signal $m[k(B-A)+A]$, where $m$ is a further gain factor, (d) means for varying said gain factor *k* between zero and unity, (e) means for varying said further gain factor *m* between zero and two, (f) a pair of control members movable individually through coterminous paths of travel, (g) means coupled to said control members and responsive to the mean position of said control members along said paths for controlling said varying means (d) to render said gain factor *k* equal to zero when said mean position is located at one extremity of said paths and to render said gain factor *k* equal to unity when said means position is located at the other extremity of said paths, (h) and means coupled to said control members and responsive to the spread between said control members for controlling said varying means (e) to render said further gain factor *m* equal to unity when said spread is zero, to render said factor *m* equal to zero when said spread consists of the full extent of said paths in one sense, and to render said factor *m* equal to two when said spread consists of the full extent of said paths in the other sense, (i) whereby movement of said control members in unison from one said extremity of said paths to the other said extremity effects a complementary mix of said first and second signals, and spreading of said control members apart effects a non-complementary superimposition of said first and second signals.

8. A fader amplifier according to claim 7 wherein said responsive means (g) and (h) comprise (j) a differential mechanism having two sun wheels, at least one planet wheel and a planet wheel cage, (k) means connecting each said control member to a respective said sun wheel, (l) means connecting said varying means (d) to said cage, (m) and means connecting said varying means (e) to said planet wheel.

References Cited by the Examiner

UNITED STATES PATENTS

| | | | |
|---|---|---|---|
| 2,412,279 | 12/1946 | Miller | 330—130 X |
| 2,971,174 | 2/1961 | Lyon | 338—131 X |
| 3,195,067 | 7/1965 | Klein et al. | 330—126 |
| 3,210,683 | 10/1965 | Pay | 330—69 X |

FOREIGN PATENTS

| | | |
|---|---|---|
| 1,141,668 | 12/1962 | Germany. |

ROY LAKE, *Primary Examiner.*

F. D. PARIS, N. KAUFMAN, *Assistant Examiners.*